(No Model.)
A. PERSONNE.
Electric Clock.
No. 238,428. Patented March 1, 1881.
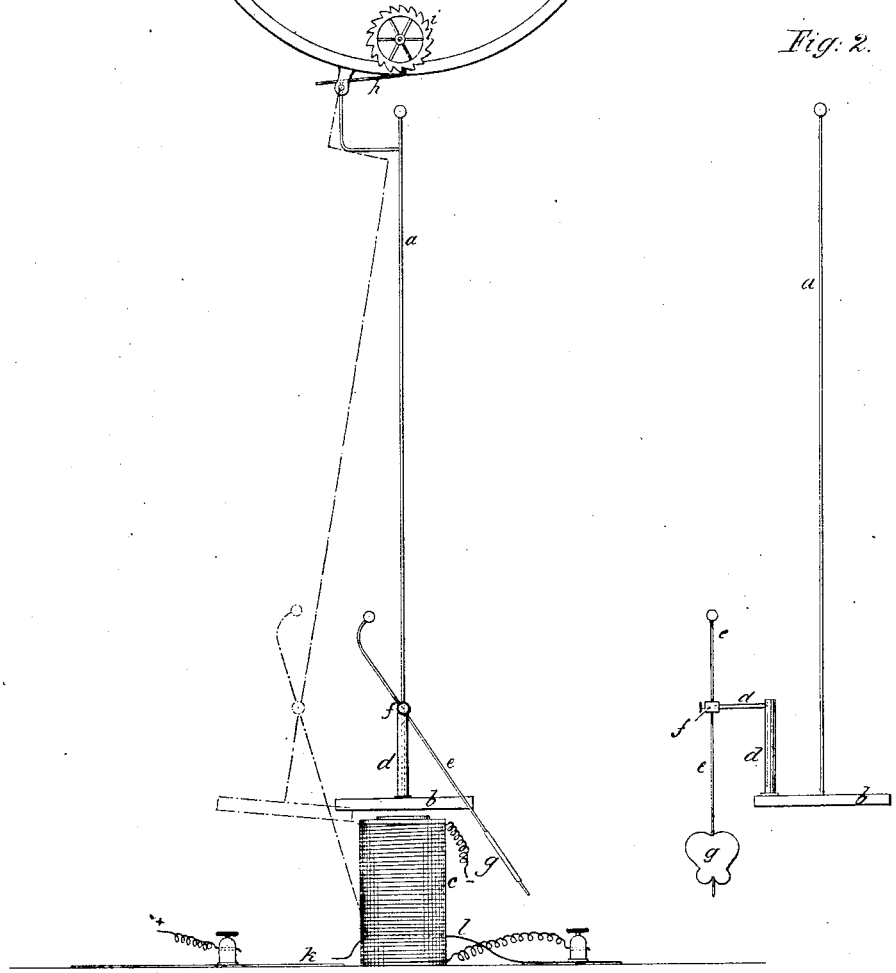
Witnesses:
Inventor:

UNITED STATES PATENT OFFICE.

AUGUSTIN PERSONNE, OF PARIS, FRANCE, ASSIGNOR TO ALPHONSE LEMOINE, OF SAME PLACE.

ELECTRIC CLOCK.

SPECIFICATION forming part of Letters Patent No. 238,428, dated March 1, 1881.

Application filed December 29, 1880. (No model.) Patented in France August 7, 1880.

*To all whom it may concern:*

Be it known that I, AUGUSTIN PERSONNE, of Paris, France, have invented Improvements in Electric Clocks; and I do hereby declare that the following is a full, clear, and exact specification of the same, reference being had to the annexed sheet of drawings.

My invention relates to that class of electric clocks in which an electro-magnet is used to automatically give an impulse to the pendulum of the clock every time its oscillation decreases below a certain amplitude. For this purpose the electric current is, when necessary, sent through the coils of the magnet by means of a device mounted upon the pendulum, and having a differential motion caused and controlled by the resistance opposed to it by the air during its oscillation.

My said invention will be more clearly understood by reference to the annexed sheet of drawings, in which—

Figure 1 shows a front view of a clock-pendulum constructed according to my invention. Fig. 2 shows a side view of the device which closes and breaks the electric circuit when required.

In both these figures same letters refer to similar parts.

$a$ is the pendulum-rod, the lower end of which is provided with a weight or ball, $b$. This ball is made of a piece of iron, in order that it may be attracted, when necessary, by the electro-magnet $c$. Mounted upon the ball $b$ is a post or beam, $d$, upon the horizontal arm of which turns freely a sleeve, $f$, carrying a light rod, $e$. This small rod $e$ is provided near its lower end with a paper butterfly, $g$, or other light piece of mica, board, paper, metal, foil, &c., affording resistance to the air during the movement of the pendulum and rod $e$, as will be hereinafter more fully described.

To the upper end of the pendulum is attached a pawl, $h$, which meshes with the teeth of a ratchet-wheel, $i$, and causes this latter to turn one tooth for each double oscillation of the pendulum, said ratchet-wheel being connected with the clock-work, which is disposed in any convenient manner.

Upon the clock-table is fixed a metal plate, $k$, communicating with one of the poles of a suitable battery, (pole $+$, for instance;) another plate or metallic spring, $l$, communicates with the electro-magnet which is connected with the other pole (pole $-$) of the battery.

As long as the amplitude of oscillation of the pendulum has not decreased below the convenient limit, the rod $e$ oscillates and slides upon the spring-plate $l$ without depressing it. The said effect is obtained by the inclination given to the rod $e$ by the resistance of the air upon the surface of the paper fly $g$. At this point, if the oscillation and speed of the pendulum decrease, the resistance of air upon the surface of the paper fly $g$ is lessened, so that the rod $e$ tends to become perpendicular. This rod presses thus the contact $l$ upon the plate $k$, so that, the electric circuit being closed, the electro-magnet becomes active. As this operation takes place before the pendulum is at its lower point, as shown by the dotted lines in Fig. 1, the ball $b$ is attracted and the pendulum receives an impulse. The speed and oscillation of the pendulum being increased by said impulse, they become normal again, so that the rod $e$ slides upon the spring $l$, which rises. The electric circuit is thus broken, and the pendulum oscillates freely until its oscillatory movement decreases to such an extent that the before-described impulse is again imparted to it.

I do not, however, confine myself to the exact forms and disposition shown in the annexed drawings, as I may employ, instead of the paper, mica, or metal butterfly $g$, any other suitable light disk or plate upon which the resistance or pressure of air may act in the above-mentioned manner.

The battery (which is not shown in the drawings) may be concealed in the bottom of the clock-case or located in any suitable place. The circuit-operating device may also be mounted in any convenient manner and at any convenient point of the pendulum-rod, either above or below the pivot of said pendulum.

My clock mechanism consisting only of light pieces operated by an external force, (the resistance presented by air to the movement of a light disk, plate, butterfly, &c.,) it is only necessary, in order to put the said mechanism in motion, to use a weak battery—a result which has not yet been obtained. The action of said mechanism is always reliable and accurate, as it does not depend on the strength of the electric current or battery.

I claim—

1. In an electric clock, a circuit-operating device consisting of a rod, $e$, pivoted upon a beam, $d$, mounted on the ball $b$ of pendulum $a$, and provided with a paper butterfly or other light disk, $g$, in order to operate upon the contact $l$, substantially as and for the purpose set forth.

2. In an electric clock, the combination, with a pendulum, $a$, its ball $b$, a ratchet, $i$, operated by a pawl, $h$, an electro-magnet, $c$, actuated by a suitable battery, and two contacts, $k$ and $l$, of a circuit-operating device consisting of a rod, $e$, provided with a paper butterfly or other light disk, $g$, and operating substantially as and for the purpose set forth.

AUGUSTIN PERSONNE.

Witnesses:
  ROBT. M. HOOPER,
  JEAN BAPTISTE ROLLAND.